United States Patent [19]

Alker

[11] Patent Number: 4,579,058
[45] Date of Patent: Apr. 1, 1986

[54] CAP-SHAPED COVER FOR HOLLOW-CHARGE MINES

[75] Inventor: Erich Alker, Bergisch-Gladbach, Fed. Rep. of Germany

[73] Assignee: Dynamit Nobel Aktiengesellschaft, Troisdorf, Fed. Rep. of Germany

[21] Appl. No.: 643,029

[22] Filed: Aug. 21, 1984

[30] Foreign Application Priority Data

Aug. 24, 1983 [DE] Fed. Rep. of Germany ....... 3330502

[51] Int. Cl.⁴ ............................................. F42B 23/24
[52] U.S. Cl. .................................................... 102/401
[58] Field of Search ......................................... 102/401

[56] References Cited

U.S. PATENT DOCUMENTS 4,304,186 12/1981 Fischer et al. ...................... 102/401
4,368,671 1/1983 Weber et al. ........................ 102/401

FOREIGN PATENT DOCUMENTS 3131691 3/1983 Fed. Rep. of Germany ...... 102/401
3230355 2/1984 Fed. Rep. of Germany ...... 102/401

*Primary Examiner*—Charles T. Jordan
*Attorney, Agent, or Firm*—Antonelli, Terry & Wands

[57] ABSTRACT

A cap-shaped cover for hollow-charge mines is adapted to form a hollow cavity adjacent to a portion of the mine. The cover, in its initial position, is in a folded, collapsed, introverted or the like closed condition and in its operational position, the cover is extended by a compression spring to assume a shell-like, hemispherical, or open configuration that defines the cavity. The cover includes at least one ventilating device for venting of the closed cover, a flexible body portion and the compression spring. The spring is formed of at least two separate, identical parts. These parts are arranged in the cover in such a way that the compression spring is symmetrical in all vertical section planes. The lead angle of a central turn section of each individual part of the compression spring, in the operational position of the compression spring, is 15°–45°, at least in the zone adjoining an outer turn section. Preferably, an inner turn section of the compression spring is held in a continuous groove of the covering member.

3 Claims, 5 Drawing Figures

CAP-SHAPED COVER FOR HOLLOW-CHARGE MINES

This invention relates to an improved cover for hollow-charge mines, which is collapsed in its inoperative position or condition and which is expanded to have a cap-shape in its operative position, and to the assembly made up of the cover and hollow-charge mine.

Mines which contain hollow charges, so-called hollow-charge mines, usually comprise—as described in DOS 2,840,362 (which corresponds to U.S. Pat. No. 4,304,186)—a cap-shaped cover to keep the hemispherical region of the hollow charge free of foreign bodies, such as, for example, sand, water, ice, and, optionally, to mitigate the impact of the mine on the ground when dropped from the air. In the initial position, for example, during storage and transporation, the cap-shaped cover is folded, collapsed, introverted, or the like. According to DOS 3,131,691, the cap-shaped cover is placed into the operational position by means of a compression spring having the shape of a truncated cone, the cover being extended to a shell-like, hemispherical, or similar cap-shaped configuration.

The conventional cap-shaped covers with one-piece, truncated-cone-shaped springs exhibit the disadvantages that the extension force of the one-piece truncated-cone spring is not fully satisfactory, especially at low temperatures, and that, as was demonstrated by experiments, the surface of the target object facing the mine can be exposed to secondary hits. This scattering is produced by a deflection of the hollow-charge jet and leads to reduced penetrating power.

It is an object of the invention to develop a cap-shaped cover having a spring that effects adequate extension of the cover even at low temperatures and wherein, in the operational position of the cover, the formation of the hollow-charge jet after ignition of the mine or the corresponding active element is impaired as little as possible to avoid reduction in the penetrating power of the jet.

This object has been attained by providing a cover for mines which, in its initial position, is in a folded, collapsed, introverted, or the like, closed condition and, in its operational position, is in an extended or open condition by action of a compression spring to assume a shell-like, hemispherical, or like configuration. The cover comprises a flexible covering member or body portion, at least one ventilating means formed in the covering member for allowing entry of air into the closed cover (when the cover is in the inoperative or closed position) and means forming a compression spring that comprises at least two separate, identical parts or spring elements arranged in the covering member in such a way that the compression spring means is symmetrical in all vertical section planes. Each of the identical parts comprises a planar, outer, circular-arc-shaped turn section, an adjoining central turn section with variable radius of curvature, and a planar, inner, circular-arc-shaped turn section having the same center of curvature as the outer turn section and a lead angle ($\alpha$) of the central turn section in the operational position of the compression spring, is 15°–45°, at least in a zone adjoining the outer turn section.

It has been recognized that, in the previous solution, the first turn of the truncated-cone spring facing the hollow charge enters into a cavity formed by the covering member (which is, for example, a hemispherical shape in the operational position) on one side and has too small a lead angle. In this arrangement, the spring wire is concentrated in this region, resulting in a deflection of the hollow-charge jet emitted from the mine with the aforementioned, undesirable consequences (i.e., secondary hits and reduced penetrating power).

Recognizing the causes of the heretofore unsatisfactory solution led to the arrangement of the compression spring in accordance with this invention. This solution has the following advantages. The means forming the compression spring is symmetrical in all vertical section planes. Thus, lateral deflections of the hollow-charge jet are avoided. It has been possible to reduce the mass of the spring means by about 25% by dividing the spring means (smaller total length). The spring force effecting extension of the cap-shaped covering member is increased by dividing the spring since thereby several resilient windings are created. By increasing the lead angle of the central turn section of each spring element, at least in the zone adjoining the outer turn section, the accumulation of spring wire in the base region of the cap-shaped covering member (i.e., the side of the cover facing the hollow charge in the operational position) has been reduced whereby danger of deflection of the hollow-charge jet has been further diminished.

The mounting of the inner turn section of each element forming the compression spring means in a continuous groove of the covering member is a preferred embodiment of the invention. Such mounting simplifies assembly as compared with the heretofore used solution wherein, for example, the spring was cemented to the covering member.

The invention will be described in greater detail below with reference to an embodiment illustrated in the accompanying drawings, in part in sectional views, wherein.

Figure 4:
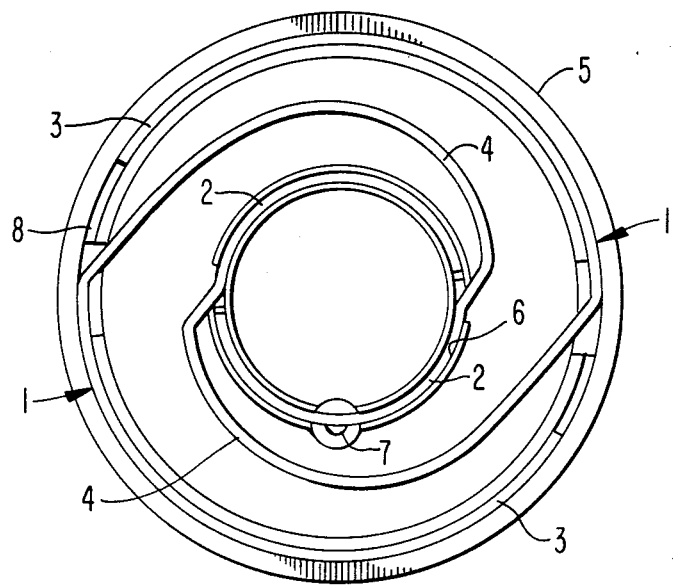
Figure 5:
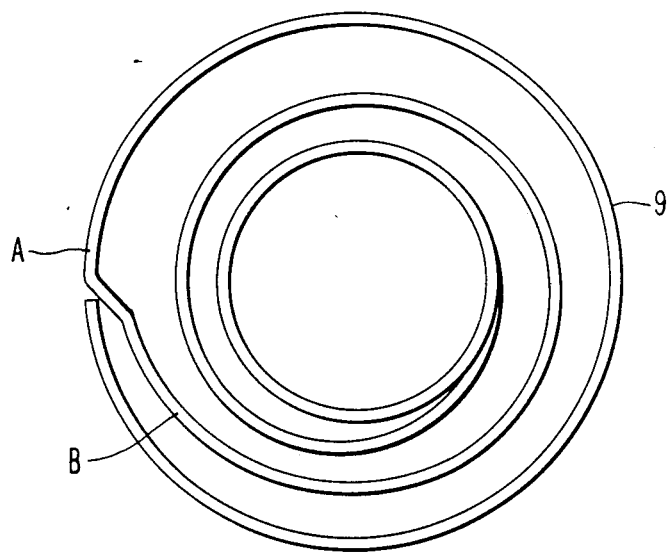

FIG. 4 is an elevational view from the bottom of a cap-shaped cover with a bipartite compression spring means being inserted therein; and FIG. 5 shows, for comparison, a heretofore deployed truncated-cone spring of the type shown in U.S. Pat. No. 4,304,186 in a top view.

Figure 1:
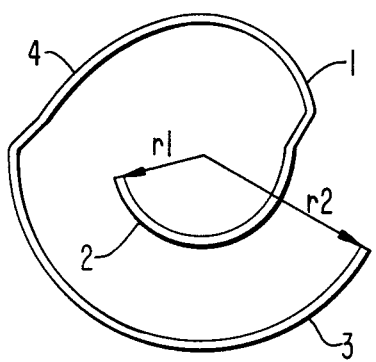
FIG. 1 shows one part or spring element of a compression spring means in a top view.

FIG. 1 shows one part of a two part compression spring means according to the invention. The compression spring means consists preferably of two identical parts 1, but the compression spring may also be composed of more than two identical parts. Part 1 exhibits an outer, planar circular-arc-shaped turn section 3 associated with the bottom zone of the cover, an adjoining, central turn section 4 with variable radius of curvature, and a planar, internal, circular-arc-shaped turn section 2 having the same center of curvature as the external turn section 3. It can be seen from the radii $r_1$, $r_2$ indicated in FIG. 1 that the turn sections 2 and 3 have the same center of curvature. Part 1 consists, for example, of steel spring wire. The illustrated part 1 is wound in the clockwise direction as seen from the external turn section 3 to the internal turn section 2. Each of the parts 1 of the compression spring means according to this invention can, however, also exhibit the opposite winding direction.

Figure 2:
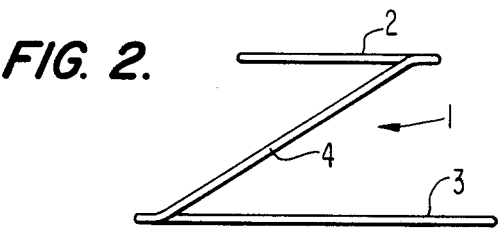
FIG. 2 is an elevational view of the part or spring element shown in FIG. 1.

In FIG. 2, part 1 is shown in an elevational view in a condition wherein it is not installed in the cap-shaped cover. The reference numerals and the parts denoted thereby are the same as described in connection with FIG. 1.

Figure 3:
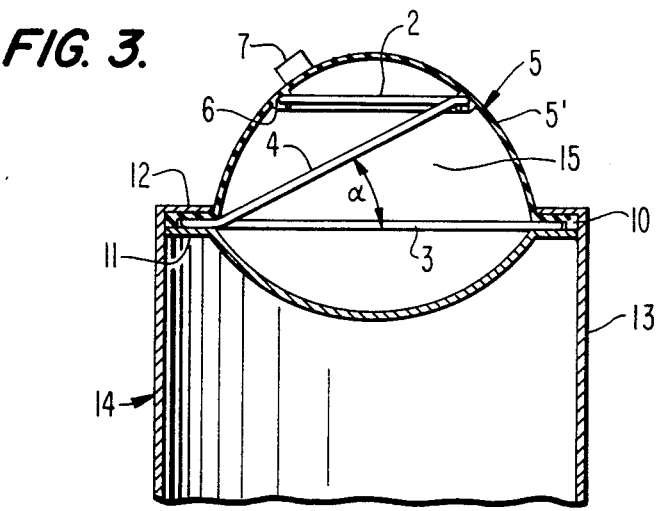
FIG. 3 is a longitudinal section through a cap-shaped cover with compression spring means in the operative position on a hollow-charge mine.

FIG. 3 shows, in a longitudinal sectional view, a cap-shaped cover 5 comprised of the flexible covering member or body portion 5', with one part 1 of the compression spring means in the operational position. For the sake of simplicity, only one part 1 of the at least two parts 1 of the spring means is shown. In this illustration, the mounting of the inner turn section 2 in a continuous groove 6 formed in the covering member can be seen. Furthermore, the lead angle α of the central turn section 4 is illustrated, which is measured with respect to the external turn section 3. The flexible covering member or flexible body portion 5' is made of a flexible sheet-like material, preferably an elastic material. Such material can be an elastomer, such as a silicon rubber, as well as ethylene-propylene elastomers, chloroprene polymers, or a natural rubber. Also, a textile reinforced elastomeric material may be used as well as a flexible sheet-like material of textile or synthetic film, which is deformable without being elastic and which has a folded bellows-type construction.

A closed cavity 15 is formed by the cover 5 which is secured to the mine 14 with an air-tight connection. This connector is provided by a rim 10 of the covering member which is positioned between flanges 11 and 12 of the casing 13 of the mine 14. Other details of the mine construction are the same as those shown in U.S. Pat. No. 4,304,186; the description and illustration of which are incorporated herein by reference to this patent. The construction of the ventilating means 7, which is schematically shown in FIG. 3, is also described and illustrated in greater detail in U.S. Pat. No. 4,304,186, which disclosure is also incorporated herein by reference to this patent.

FIG. 4 illustrates schematically the mounting of the compression spring means in the cap-shaped covering meber 5'. In this instance, the compression spring means consists of two parts or spring elements 1. These parts are held, with their inner turn section 2, in the continuous groove 6 and, with their outer turn section 3, in a continuous groove 8, also formed in the member 5'. It can be seen from FIG. 4 that the compression spring is symmetrical in all vertical section planes. A mirror-image symmetry exists herein. Furthermore, a ventilating means or valve 7, or the opening provided therefor, is illustrated in this figure. Also, the central turn section 4 of part 1 can be seen.

FIG. 5 shows, for comparison purposes, a truncated-cone spring 9 heretofore employed for extending cap-shaped covers. It can be derived from the figure that the accumulation of spring wire is especially large in the zone between points A and B and that the spring is asymmetrical especially in the zone between points A and B. Such accumulation has been recognized as cause for the deflection of the hollow-charge jet and has been avoided, inter alia, by the development of the compression spring of this invention. Another reason for this deflection is the small lead angle according to FIG. 1b of the U.S. Pat. No. 4,306,186 as compared with the angle α of FIG. 3 of this invention.

What is claimed is:

1. A cap-shaped cover for mines or corresponding military active elements, which, in its initial closed position, is folded, collapsed, introverted, or the like condition and in its operational position is extended by a compression spring means to assume a shell-like, hemispherical, or like open configuration that defines a cavity adapted to be tightly sealed all around said mine, and which comprises a flexible covering member, at least one ventilating means formed in said member for allowing entry of air into the closed position of the cover, and the compression spring means; said compression spring means comprising at least two separate, identical parts arranged in the covering member in such a way that the compression spring means is symmetrical in all vertical section planes, each of the identical parts comprising a planar, outer, circular-arc-shaped turn section, an adjoining central turn section with variable radius of curvature, and a planar, inner, circular-arc-shaped turn section having the same center of curvature as the outer turn section; and the lead angle (α) of the central turn section in the operational position of the compression spring means, being 15°–45°, at least in the zone adjoining the outer turn section.

2. The cover according to claim 1, wherein the inner turn sections of the compression spring means are held in a continuous groove of the covering member.

3. An assembly comprising the cover of claim 1, secured to a hollow-charge mine to provide a gas-tight cavity in the operational position of said cover.

* * * * *